(12) United States Patent
Sitko

(10) Patent No.: US 9,333,934 B2
(45) Date of Patent: May 10, 2016

(54) VEHICLE BODY STRUCTURE

(71) Applicant: Nissan North America, Inc., Franklin, TN (US)

(72) Inventor: Jeffrey Sitko, Saline, MI (US)

(73) Assignee: Nissan North America, Inc., Franklin, TN (US)

( * ) Notice: Subject to any disclaimer, the term of this patent is extended or adjusted under 35 U.S.C. 154(b) by 55 days.

(21) Appl. No.: 14/304,546

(22) Filed: Jun. 13, 2014

(65) Prior Publication Data

US 2015/0360637 A1     Dec. 17, 2015

(51) Int. Cl.
| B60R 21/213 | (2011.01) |
| B60R 21/21 | (2011.01) |
| B60R 21/2338 | (2011.01) |
| B60R 21/16 | (2006.01) |

(52) U.S. Cl.
CPC ........... *B60R 21/213* (2013.01); *B60R 21/2338* (2013.01); *B60R 2021/161* (2013.01); *B60R 2021/23386* (2013.01)

(58) Field of Classification Search
CPC .... B60R 21/21; B60R 21/213; B60R 21/232; B60R 21/23138; B60R 2021/161; B60R 2021/23386; B60R 21/2338; F16B 13/0808
See application file for complete search history.

(56) References Cited

U.S. PATENT DOCUMENTS

| 1,224,698 | A | * | 5/1917 | Zifferer | F16B 13/0808 411/346 |
| 1,269,302 | A | * | 6/1918 | Paine et al. | F16B 13/0808 411/346 |
| 1,956,623 | A | * | 5/1934 | Pleister | F16B 13/0808 411/346 |
| 3,241,420 | A | * | 3/1966 | Passer | F16B 13/0808 411/346 |
| 5,333,898 | A | * | 8/1994 | Stutz | B60R 21/213 280/728.2 |
| 5,924,723 | A | | 7/1999 | Brantman et al. | |
| 6,237,943 | B1 | | 5/2001 | Brown et al. | |
| 6,273,458 | B1 | | 8/2001 | Steffens, Jr. et al. | |
| 6,454,296 | B1 | * | 9/2002 | Tesch | B60R 21/232 280/730.2 |
| 6,709,212 | B1 | * | 3/2004 | Lauchner | F16B 13/0808 411/342 |
| 6,896,288 | B2 | | 5/2005 | Tanaka et al. | |
| 7,044,500 | B2 | | 5/2006 | Kalandek et al. | |
| 7,219,921 | B2 | | 5/2007 | Noguchi | |
| 7,267,364 | B2 | | 9/2007 | Noguchi et al. | |
| 7,273,228 | B2 | | 9/2007 | Noguchi et al. | |
| 7,306,258 | B2 | | 12/2007 | Noguchi et al. | |
| 7,338,071 | B2 | | 3/2008 | Noguchi et al. | |
| 7,347,447 | B2 | | 3/2008 | Nakanishi | |
| 2008/0080949 | A1 | * | 4/2008 | Deng | F16B 37/0821 411/342 |

* cited by examiner

*Primary Examiner* — Paul N Dickson
*Assistant Examiner* — Joselynn Y Sliteris
(74) *Attorney, Agent, or Firm* — Global IP Counselors, LLP

(57) ABSTRACT

An airbag is fixed to a first location of a window in a stowed orientation and extends to a lower end of the window in a deployed orientation. A tether has an airbag end fixedly attached to the first location and an anchor end fixedly attached to a second location proximate the lower end of the window. The tether extends through a tether receiving aperture of the airbag such that during movement of the airbag from the stowed orientation to the deployed orientation the distal end moves along the tether. A one-way movement member is fixed to the tether proximate the anchor end. The one-way movement member passes through the tether receiving aperture in response to the airbag moving from to the deployed orientation and limits movement of the airbag back toward the stowed orientation.

14 Claims, 10 Drawing Sheets

VEHICLE BODY STRUCTURE

BACKGROUND

1. Field of the Invention

The present invention generally relates to a vehicle body structure that includes an airbag and an airbag tether. More specifically, the present invention relates to an airbag that is movable from a stowed orientation to a deployed orientation, and an airbag tether that includes a one way movement member that restricts movement of the airbag once the airbag has moved to the deployed orientation.

2. Background Information

Passenger vehicles with windows are required to have airbags that deploy in response to an impact event such that an airbag adjacent to a window at least partially covers the adjacent window. Many such airbags are provided with tethers that guide movement of the airbag during deployment.

SUMMARY

One object of the disclosure is to provide an airbag with a tether that guides the airbag to a deployed orientation during deployment and provide the tether with a one-way movement restricting member that allows the airbag to fully deploy, and retains an airbag in a deployed orientation, preventing the airbag from moving away from the deployed orientation.

In view of the state of the known technology, one aspect of the disclosure is a vehicle body structure that includes a first elongated body structure, a second elongated body structure, an airbag, a tether and a one-way movement member. The first elongated body structure extending in a first direction and the second elongated body structure extends in a second direction transverse to the first direction. The first and second elongated body structures at least partially surround a window opening. The airbag has a mounting structure mounted to and extending along the first elongated body structure. The airbag has a distal end positioned adjacent to the mounting structure in a stowed orientation and arranged to move in the second direction along the second elongated structure to a deployed orientation. The distal end is spaced apart from the mounting structure and the airbag at least partially covers the window opening in the deployed orientation. The distal end of the airbag has a tether receiving aperture. The tether has an airbag end and an anchor end. The airbag end is fixed to a first location proximate a first end of the mounting structure of the airbag adjacent to the second elongated body structure. The anchor end is fixedly attached to the second elongated body structure at a second location proximate a distal end of the airbag with the airbag in the deployed orientation. The tether extends through the tether receiving aperture such that during movement of the airbag from the stowed orientation to the deployed orientation the distal end moves along the tether. The one-way movement member is fixed to the tether proximate the anchor end but spaced apart from the anchor end. The one-way movement member passes through the tether receiving aperture from a first side of the airbag to a second side of the airbag in response to the airbag moving from the stowed orientation to the deployed orientation. With the airbag in the deployed orientation the one-way movement member retains the airbag in the deployed orientation and limits movement of the distal end of the airbag with respect to the second location.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
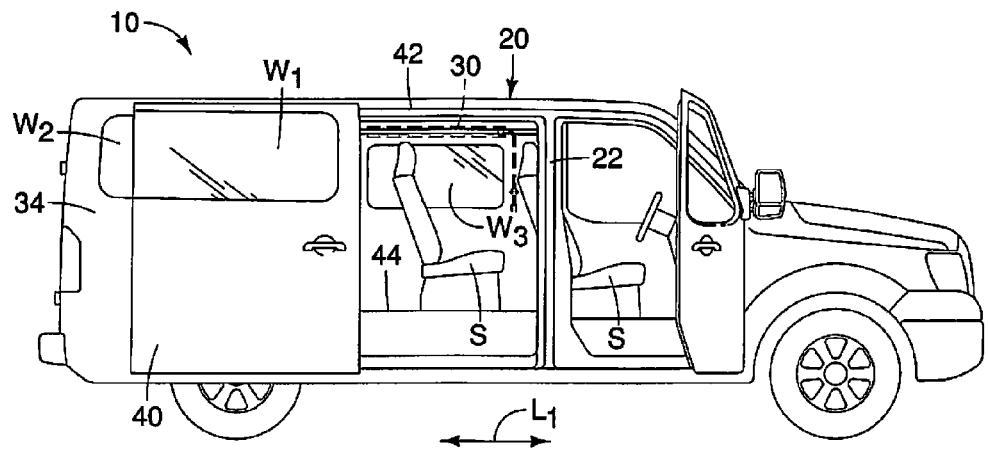
FIG. 1 is a side view of a passenger vehicle showing a plurality of seats adjacent to windows in accordance with a first embodiment.

Referring initially to FIG. 1, a vehicle 10 that includes a plurality of airbags 12 and corresponding tethers 14 is illustrated in accordance with a first embodiment. A description of the airbags 12 and tethers 14 is provided following a description of the vehicle 10. In the depicted embodiment, the vehicle 10 is a commercial van that is configured to carry a plurality of passengers. However, it should be understood from the drawings and the description herein that the vehicle 10 can be any of a variety of vehicles that carry at least one passenger. More specifically, one of the airbags 12 and tethers 14 can be provided in any locations adjacent to a passenger seat, as described in greater detail below.

The vehicle 10 has a body structure 20 that includes, among other features, a plurality of pillar structures 22, 24, 26 and 28, roof rail structures 30 and 32, side panels 34 and 36, a sliding door 40, a roof structure 42 and a floor structure 44.

The pillar structures 22, 24, 26 and 28 all extend in an upright or vertical direction relative to the vehicle 10. The pillar structures 22 and 26 are B-pillars and the pillar structures 24 and 28 are C-pillars in the depicted embodiment. However, as will be understood from the description below of the airbag 12 and the tether 14, the pillar structure 22 can be any one of the pillar structures within the vehicle 10, including a front pillar such as an A-pillar, an intermediate pillar such as one of the B-pillars or one of the C-pillars, or a rear pillar such as a D-pillar.

The roof rail structures 30 and 32 extend in a vehicle longitudinal direction $L_1$, as labeled in FIGS. 1-4. More specifically, the roof rail structure 30 extends along a passenger's side of the vehicle 10 supporting the roof structure 42 above the pillar structures 22 and 26. Further, the pillar structures 22 and 26 are rigidly fixed by, for example, welding techniques to the roof rail structure 30. Similarly, the roof rail structure 32 extends along a driver's side of the vehicle 10 supporting the roof structure 42 above the pillar structures 24 and 28. Further, the pillar structures 24 and 28 are rigidly fixed by, for example, welding techniques to the roof rail structure 32. The roof structure 42 is rigidly fixed to the roof rail structures 30 and 32, by, for example, welding techniques. Since pillar structures, roof rail structures and roof structures are conventional vehicle features, further description is omitted for the sake of brevity.

The side panels 34 and 36 are fixed to respective ones of the pillar structures 22, 24, 26 and 28, and the roof rail structures 30 and 32 in a conventional manner, such as welding techniques. Since side panels are conventional vehicle features, further description is omitted for the sake of brevity.

Figure 2:
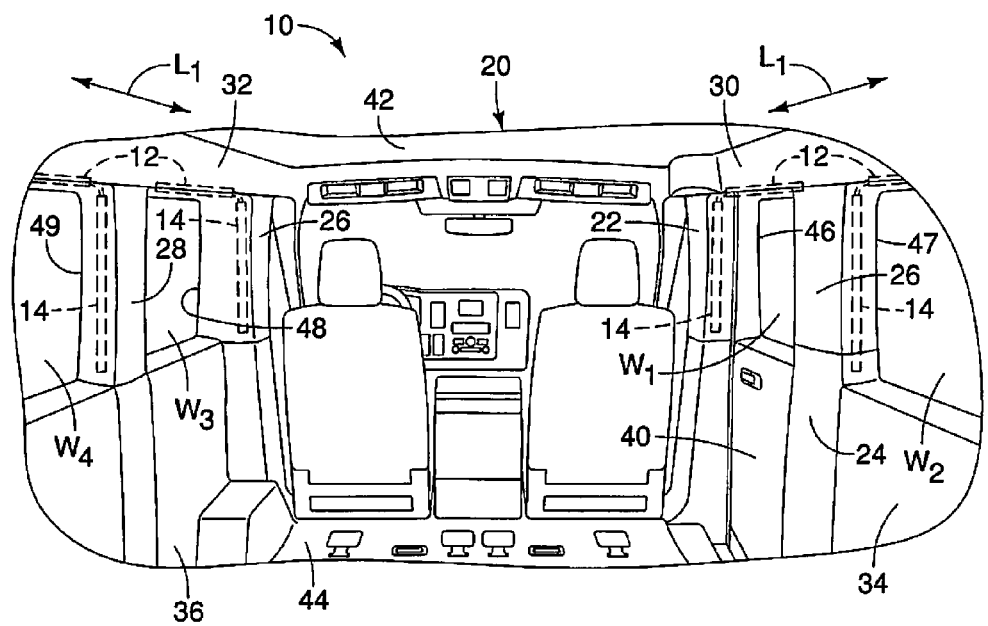
FIG. 2 is a perspective view of a passenger compartment of the passenger vehicle depicted in FIG. 1 showing a plurality of the windows with rear seats removed, each window having a corresponding airbag and tether in accordance with the first embodiment.

The sliding door 40 is supported to the pillar structures 22 and 26, the roof rail structure 30 and the side panel 34 in a conventional manner for movement between an open position (FIG. 1) and a closed position (FIG. 2).

The floor structure 44 supports and is fixedly attached to the pillar structures 22, 24, 26 and 28 in a conventional manner. The floor structure 44 also supports a plurality of seats S.

The sliding door 40 includes a window opening 46 with window glass $W_1$ supported therein. The side panel 34 further includes a window opening 47 with window glass $W_2$ supported therein. Similarly, the side panel 36 includes window opening 48 with window glass $W_3$ supported therein, and window opening 49 with window glass $W_4$ supported therein. For example, the window opening 46 is located rearward of the pillar structure 24. The window opening 47 is located between the pillar structures 26 and 28, and the window opening 49 is located rearward of the pillar structure 28, in a conventional manner. The window opening 46 in the sliding door 40 is located between the pillar structures 22 and 24 with the sliding door 40 in the closed position.

There are a plurality of the airbags 12 and corresponding tethers 14 within the vehicle 10. Specifically, there is at least one airbag 12 located above each of the window openings 46-49 and a corresponding tether 14 located in the adjacent pillar structure. For example, one of the airbags 12 is located above the sliding door 40 and hence above the window opening 46. The corresponding tether 14 is located along the pillar structure 22. Similarly, another one of the airbags 12 is located above the window opening 47. The corresponding tether 14 is located along the pillar structure 24. Yet another one of the airbags 12 is located above the window opening 48, and the corresponding tether 14 is located along the pillar structure 26. Still another one of the airbags 12 is located above the window opening 49, and the corresponding tether 14 is located along the pillar structure 28. It should be understood from the drawings and the description herein that at least one of the airbags 12 and corresponding tether 14 is installed adjacent to a window opening such that, upon deployment, the airbag 12 covers at least a portion, or all, of the adjacent window opening. Alternatively, a first single airbag 12 may extend along the roof rail 30 such that, upon deployment, the first single airbag 12 covers all of the window openings 46 and 47; and a second single airbag extends along the roof rail 32 such that, upon deployment, the second single airbag 12 covers all of the window openings 48 and 49.

A description of a first embodiment of one of the airbags 12 and a corresponding one of the tethers 14 is now provided with specific reference to FIGS. 3-13. Since each of the airbags 12 and corresponding tethers 14 is basically identical to the others of the airbags 12 and the tethers 14, description of one of the airbags 12 and one of the tethers 14 applies equally to all. Therefore, for purposes of understanding the structure of the airbag 12 and tether 14 only one airbag 12 and one tether 14 is described below.

As described below, the airbag 12 is fixed to the roof rail structure 30 above the window opening 46. The airbag 12 is shown in FIGS. 3, 5, 7 and 9 in a stowed orientation. The airbag 12 is deployed in response to an impact event such that the airbag 12 inflates and moves to a deployed orientation as shown in FIGS. 4, 6, 8 and 10, and described in greater detail below.

Figure 3:
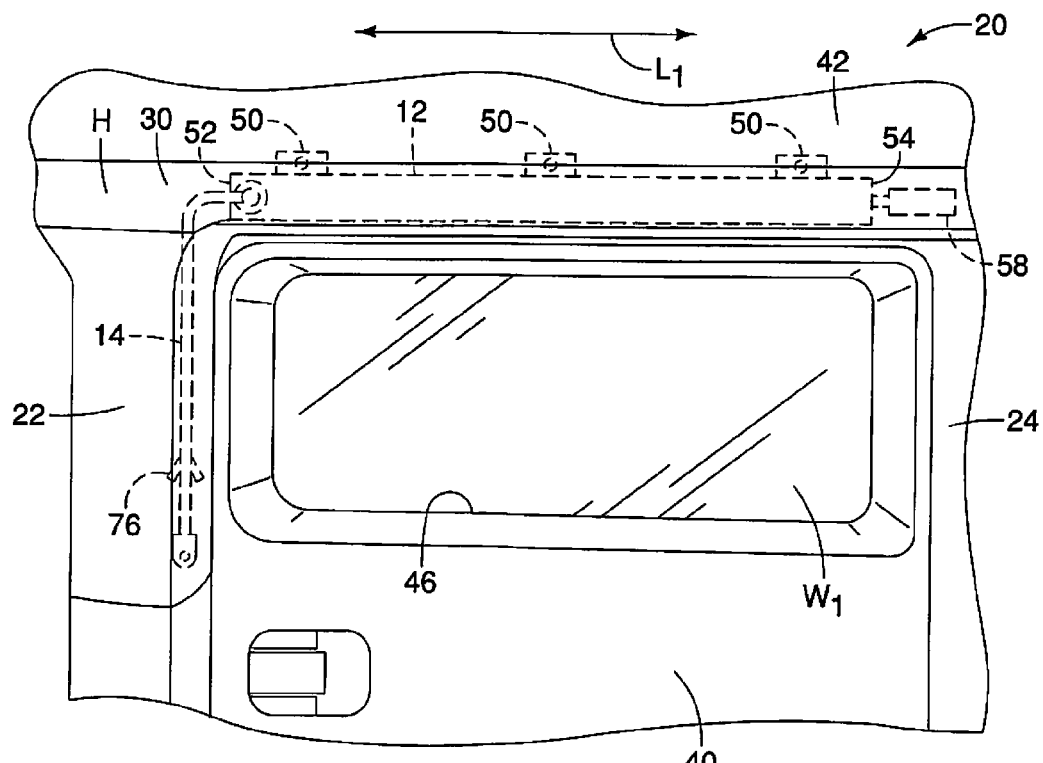
FIG. 3 is a side view of an interior surface of the passenger vehicle depicted in FIGS. 1 and 2, showing a first elongated vehicle structure (a roof rail) and a second elongated vehicle structure (a pillar) partially surrounding one of the windows of the passenger vehicle with an airbag attached to the first elongated structure and a tether attached to the second elongated structure shown in a stowed orientation in accordance with the first embodiment.
Figure 4:
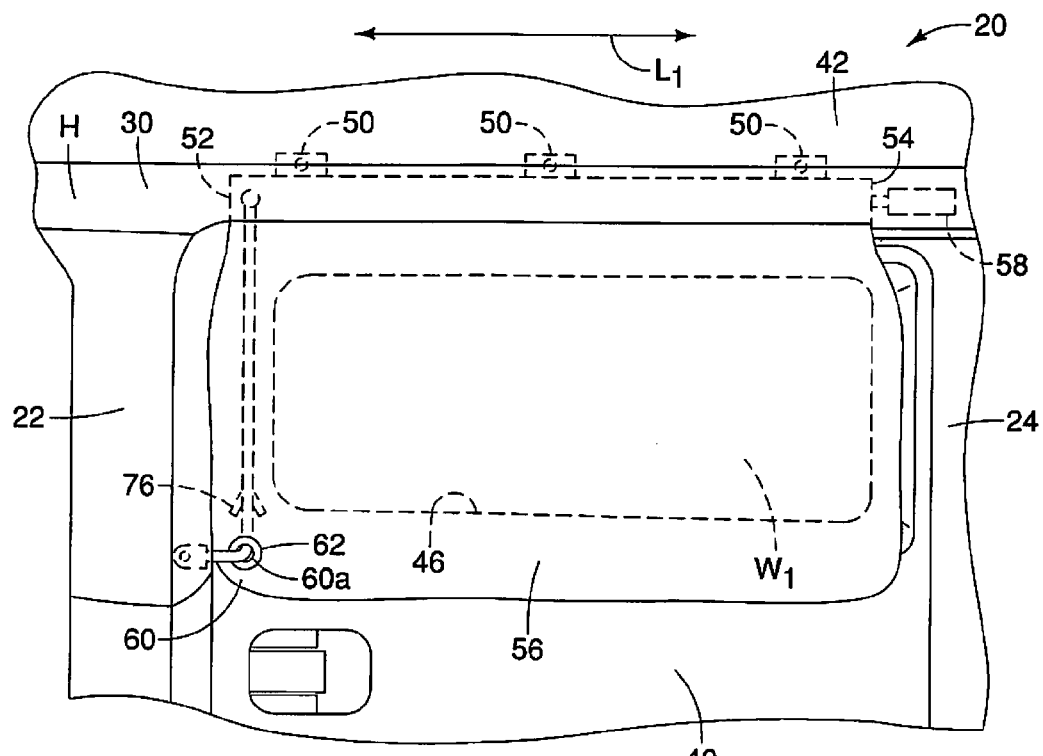
FIG. 4 is another side view of the interior surface the passenger vehicle similar to FIG. 3, showing the airbag and tether in a deployed orientation covering the window and being retained in the deployed orientation by a one-way movement restricting member of the tether in accordance with the first embodiment.
Figure 5:
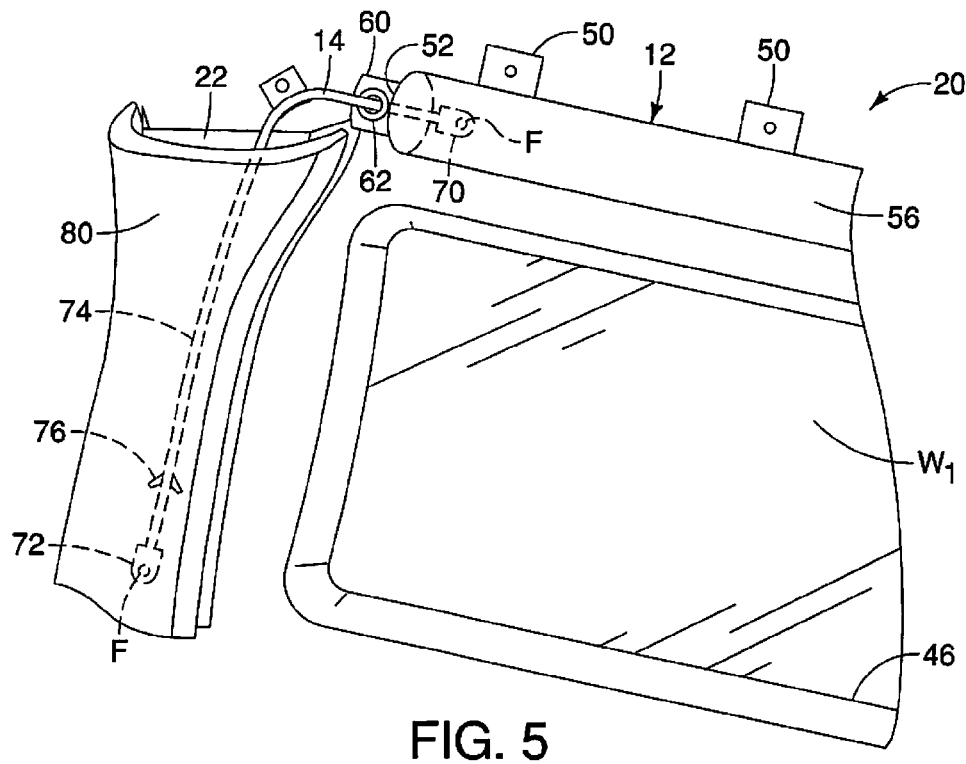
FIG. 5 is a perspective view of the interior surface of the passenger vehicle showing the window of the passenger vehicle with the airbag and the tether in the stowed orientation in accordance with the first embodiment.

As shown in FIGS. 3 and 4, the airbag 12 includes a mounting structure 50, a first end 52, a second end 54, an inflatable member 56 (FIG. 4) and a deployment apparatus 58. The airbag 12 is mounted to the roof rail structure 30 but is concealed beneath a headliner H of the roof structure 42 or alternatively a trim panel (not shown). The roof rail structure 30 constitutes a first elongated body structure that extends in a first direction (the vehicle longitudinal direction $L_1$). The mounting structure 50 of the airbag 12 is fixedly attached to the roof rail structure 30 by, for example, mechanical fasteners in a conventional manner. The airbag 12 extends along the roof rail structure 30 (the first elongated body structure), such that when the inflatable member 56 inflates and moves to the deployed orientation, the inflatable member 56 extends downward covering the window opening 46.

The inflatable member 56 can be rolled or folded accordion-style when the airbag 12 is in the stowed orientation in a conventional manner. A series of retaining bands (not shown) retain the inflatable member 56 in the stowed orientation. The retaining bands (not shown) are frangible such that upon deployment, the inflatable member 56 can rapidly move to the deployed orientation. As shown in FIG. 4 in the deployed orientation, the inflatable member 56 has a distal end 60 with a tether receiving aperture 60a reinforced by a tether ring 62. The tether ring 62 is a metallic, rigid grommet that is fitted onto the inflatable member 56 surrounding the tether receiving aperture 60a. The distal end 60 can be an extension of the inflatable member 56 or part of a main body of the inflatable member 56.

The deployment apparatus 58 is a conventional airbag inflation device that is connected to a sensor (not shown) that triggers the deployment apparatus 58 to rapidly inflate the inflatable member 56 in response to detection of an impact event.

The tether 14 has an airbag end 70, an anchor end 72, a tether section 74 and a one-way movement member 76. The airbag end 70 and the anchor end 72 are fixedly attached to the tether section 74. The tether section 74 is basically a strong wire preferably made of a strong polymer material that is flexible but does not stretch under the tension generated during deployment of the airbag 12. Alternatively, the tether section 74 can be made of a woven material (such as metallic braided material) having tensile strength that can flex, but does not stretch under the tension generated during deployment of the airbag 12. The one-way movement member 76 is fixedly attached to the tether section 74, as is described in greater detail below.

As shown in FIGS. 3-6, the airbag end 70 is basically a bracket that is attached to the roof rail structure 30 by a fastener F such that the airbag end 70 can undergo pivoting movement about the fastener F. More specifically, the airbag end 70 of the tether 14 is fixed to a first location on the roof rail structure 30 via the fastener F proximate the first end 52 of the airbag 12 and adjacent to an upper end of the pillar structure 22 (a second elongated body structure).

As shown in FIGS. 7-10, the anchor end 72 is also basically a bracket that is attached to the pillar structure 22 by another fastener F such that the anchor end 72 can undergo pivoting movement about the fastener F. More specifically, the anchor end 72 of the tether 14 is fixed to a second location on the pillar structure 22 via the fastener F proximate a lower end of the window opening 46 and proximate the distal end 60 of the airbag 12 with the inflatable member 56 of the airbag 12 in the deployed orientation. The tether section 74 of the tether 14 extends through the tether receiving aperture 60a and the tether ring 62. Consequently, during movement of the inflatable member 56 of the airbag 12 from the stowed orientation to the deployed orientation, movement of the distal end 60 is guided by the tether section 74 of the tether 14. More specifically, the distal end 60 undergoes downward movement and is guided by the tether section 74 of the tether 14 to remain in close proximity to the window opening 46, with the first end 52 remaining in close proximity to the pillar structure 22.

Figure 7:
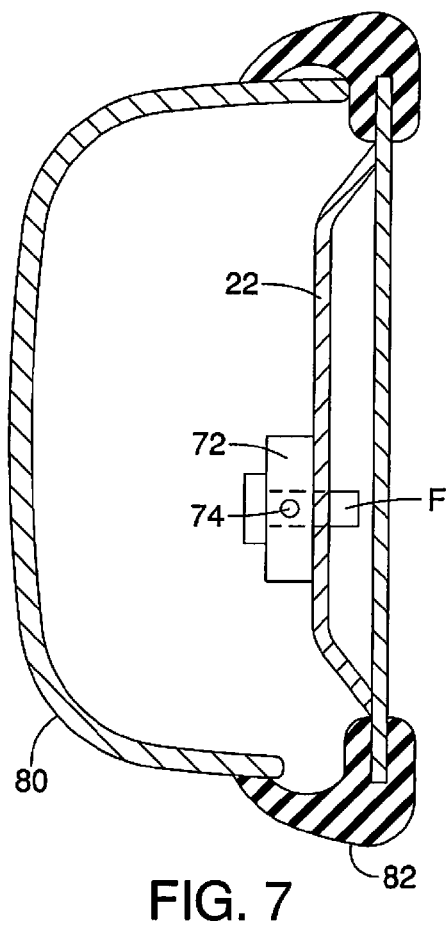
FIG. 7 is a cross-sectional view of the second elongated vehicle structure (the pillar) showing the tether in the stowed orientation in accordance with the first embodiment.
Figure 8:
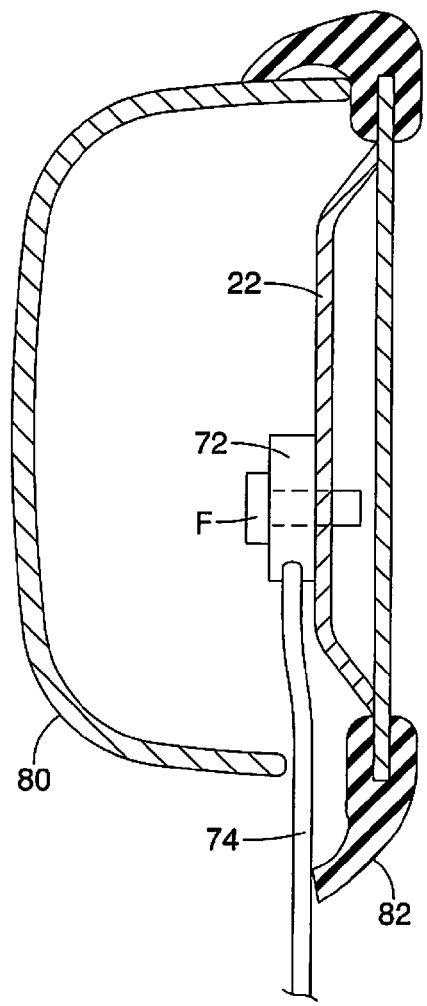
FIG. 8 another cross-sectional view of the second elongated vehicle structure similar to FIG. 7 showing the tether in the deployed orientation in accordance with the first embodiment.

FIGS. 7-10 show various movements that occur during deployment of the airbag 12. As the inflatable member 56 inflates during deployment, movement of the distal end 60 of the inflatable member 56 is guided by the tether section 74 thereby applying force on the tether section 74 of tether 14. As shown in FIGS. 7 and 8, the pillar structure 22 is covered by a pillar trim panel 80. A majority of the tether section 78 and the anchor end 72 are concealed behind the pillar trim panel 80. An edge of the pillar trim panel 80 is covered by a seal member 82. Inflation of the inflatable member 56 and movement of the tether section 74 causes the seal member 82 to move such that the tether section 74 can move out from behind the pillar trim panel 80. Alternatively, the pillar trim panel 80 can include a living hinge or other release structure allowing the pillar trim panel 80 to release the tether section 74 of the tether 14.

Figure 9:
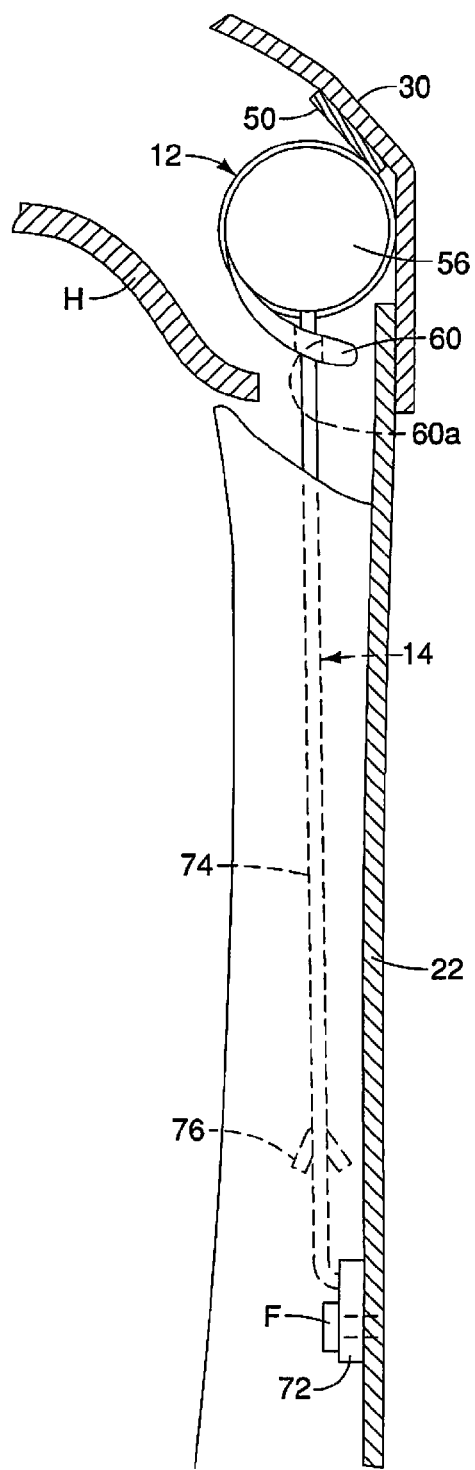
FIG. 9 is a cross-sectional view of the first elongated vehicle structure and the second elongated vehicle structure showing the airbag and the tether in the stowed orientation in accordance with the first embodiment.
Figure 10:
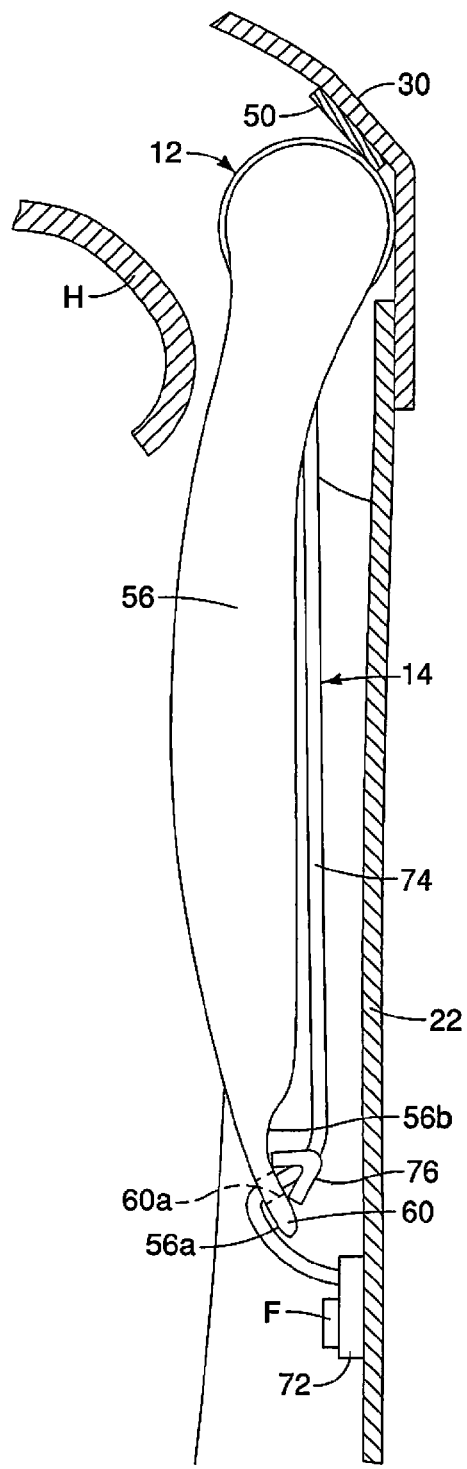
FIG. 10 another cross-sectional view of the first elongated vehicle structure and the second elongated vehicle structure similar to FIG. 9 showing the airbag and the tether in the deployed orientation with the airbag being retained in the deployed orientation by the one-way movement restricting member of the tether in accordance with the first embodiment.

As shown in FIGS. 9 and 10, as the inflatable member 56 inflates during deployment, expansion of the inflatable member 56 applies force on the headliner H causing it to bend away from the roof rail structure 30 and allow the inflatable member 56 to fully inflate and move downward covering the window opening 46. In FIGS. 9 and 10, the seal member 82 is omitted in order to show the tether section 74 of the tether 14.

Figure 6:
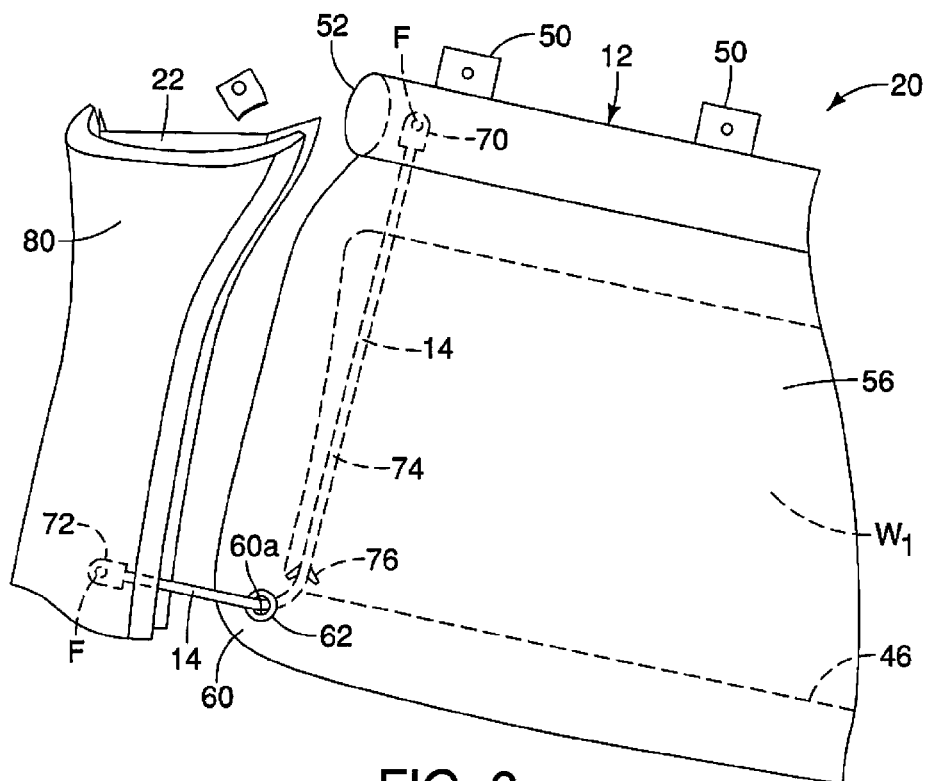
FIG. 6 is another perspective view of the interior surface the passenger vehicle similar to FIG. 5, showing the airbag and the tether in the deployed orientation covering the window and being retained in the deployed orientation by the one-way movement restricting member of the tether in accordance with the first embodiment.

A description of the one-way movement member 76 is now provided with reference to FIGS. 9-13. The one-way movement member 76 is non-movably fixed to the tether section 74 of the tether 14 proximate the anchor end 72, but spaced apart from the anchor end 72 as shown in FIGS. 4 and 6. In the first embodiment, the one-way movement member 76 includes a pair of wings 90 that pivot about a pivot pin 92, and are biased by a spring member 94. The wings 90 are fixed to the tether section 74 for pivoting movement about the pivot pin 92. Further, the pivot pin 92 can be attached to the tether section 74, extending therethrough such that the one-way movement member 76 is fixed relative to the tether section 74. The wings 90 pivot about the pivot pin 92 between an extended orientation shown in FIGS. 11 and 13, and a compressed orientation shown in FIG. 12. The wings 90 are biased to the extended orientation by the spring member 94.

The pivot pin 92 defines a fixed end 76a of the one-way movement member 76. Specifically, the pivot pin 92 (the fixed end) is fixed to the tether section 74 of the tether 14. Further, free ends of the wings 90 (distal to the pivot pin 92) define an open end 76b of the one-way movement member 76 that is wider than the fixed end 76a when the one-way movement member 76 is in the extended orientation. Further, the free ends of the wings 90 (the open end 76b of the one-way movement member 76) is wider than the tether receiving aperture 60a when the one-way movement member 76 is in the extended orientation. However, since the open end 76b (at the pivot pin 92) of the one-way movement member 76 is narrower than the tether receiving aperture 60a when the one-way movement member 76 moves to the compressed orientation during deployment, the one-way movement member 76 can pass through the tether receiving aperture 60a. Since the spring member 94 biases the wings 90 back to the extended orientation, the one-way movement member 76 cannot return through the tether receiving aperture 60a after deployment.

Figure 12:
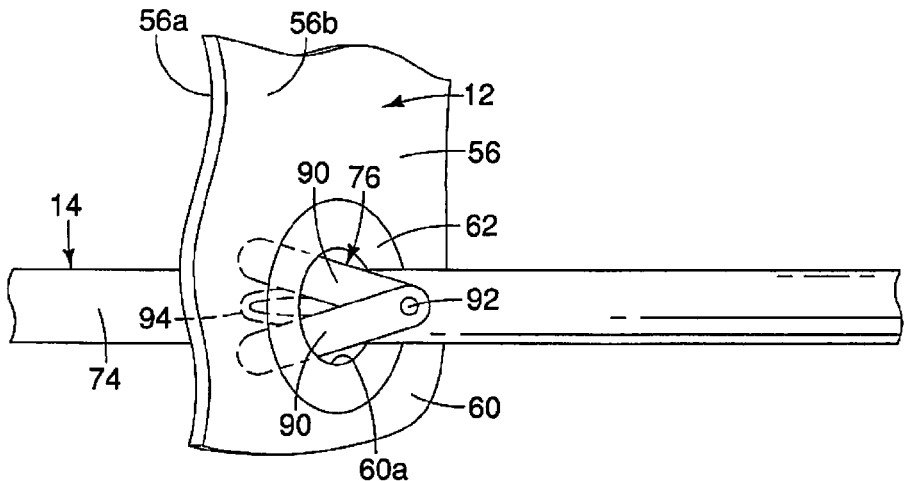
FIG. 12 is another perspective view of the distal end of the airbag similar to FIG. 11 showing the one-way movement restricting member of the tether in a compressed state passing through the tether receiving aperture in the airbag during deployment, but prior to the airbag being in fully deployed in the deployed orientation in accordance with the first embodiment.
Figure 13:
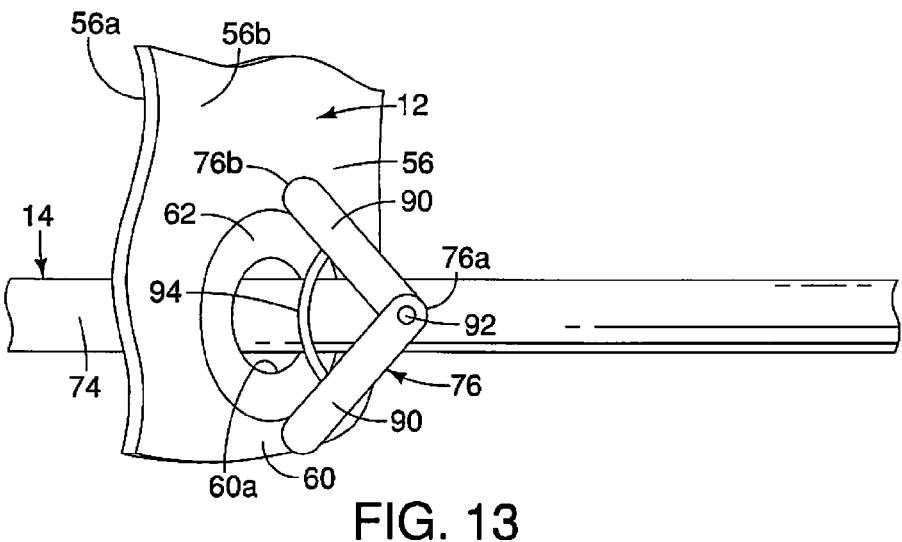
FIG. 13 is yet another perspective view of the distal end of the airbag similar to FIGS. 11 and 12, showing the one-way movement restricting member of the tether in an extended state after passing through the tether receiving aperture in the airbag with the airbag in the deployed orientation, and the one-way movement restricting member on a second side of the airbag preventing movement of the airbag away from the deployed orientation in accordance with the first embodiment.

Further in the extended orientation, the one-way movement member 76 has a tapered shape to facilitate movement to the compressed orientation as the one-way movement member 76 passes through the tether receiving aperture 60a. In other words, as the inflatable member 56 of the airbag deploys and inflates the distal end 60 of the inflatable member 56 moves along the tether section 74. Due to the rapid inflation of the inflatable member 56 and the corresponding rapid movement of the distal end 60 along the tether section 74, the one-way movement member 76 is compressed with the wings 90 moving to the compressed orientation as they pass through the tether ring 62, as shown in FIG. 12. However, once the one-way movement member 76 has passed through the tether ring 62, the wings 90 move back to the extended orientation, as shown in FIG. 13. In the extended position, the one-way movement member 76 prevents the distal end 60 of the inflatable member 56 from moving upward along the tether section 74. Further, the one-way movement member 76 ensures that the inflatable member 56 of the airbag 12 remains in the deployed orientation covering the window opening 46 and the window glass $W_1$. In other words, with the airbag 12 in the deployed orientation the one-way movement member 76 retains the airbag 12 in the deployed orientation and limits movement of the distal end 60 of the airbag 12 with respect to the anchor end 72 of the tether 14 (a second location).

Figure 11:
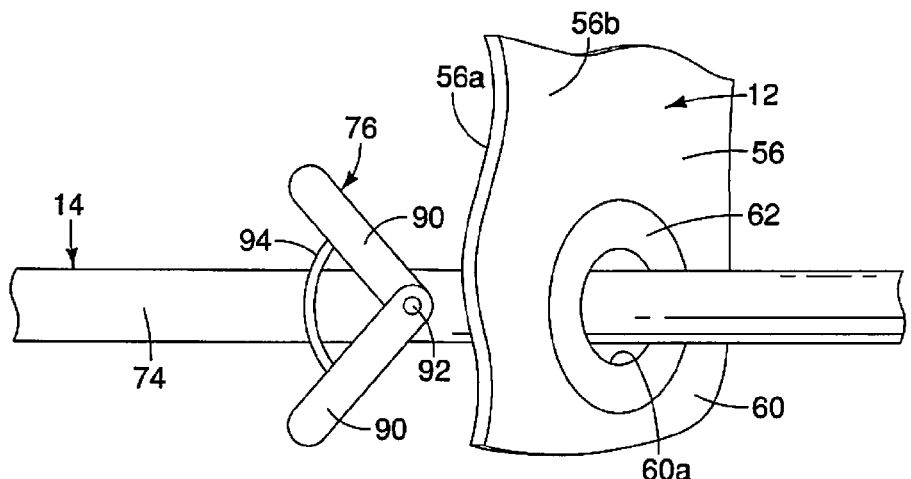
FIG. 11 is a perspective view of a distal end of the airbag showing the tether extending through a tether receiving aperture in the airbag, with the one-way movement restricting member of the tether shown on a first side of the airbag during deployment, but prior to the airbag being in fully deployed in the deployed orientation in accordance with the first embodiment.

As is also shown in FIGS. 11-13, the one-way movement member 76 passes through the tether receiving aperture 60a from a first side 56a of the inflatable member 56 of the airbag 12 to a second side 56b in response to the inflatable member 56 of the airbag 12 moving from the stowed orientation to the deployed orientation. Thereafter, contact between the wings 90 (at the open end 76b) and the second side 56b of the inflatable member 56 prevents movement of the inflatable member 56, and the airbag 12 remains in the deployed orientation covering the window opening 46.

Second Embodiment

Figure 14:
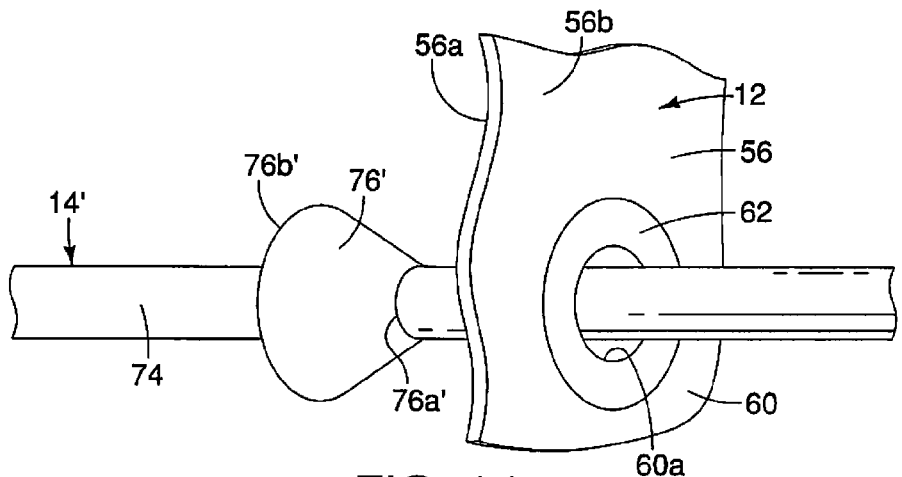
FIG. 14 is a perspective view of a distal end of the airbag showing a tether extending through a tether receiving aperture in the airbag, with a one-way movement restricting member of the tether shown on a first side of the airbag during deployment, but prior to the airbag being in fully deployed in the deployed orientation in accordance with a second embodiment.
Figure 15:
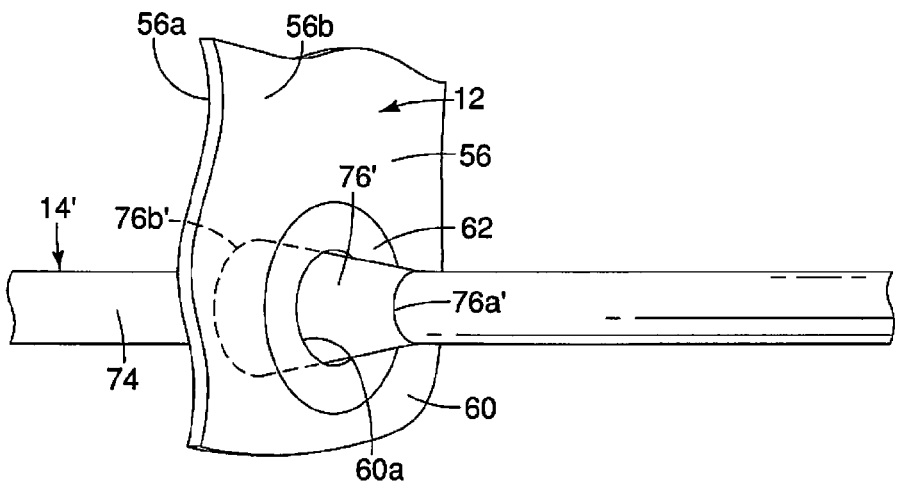
FIG. 15 is another perspective view of the distal end of the airbag similar to FIG. 14 showing the one-way movement restricting member of the tether in a compressed state passing through the tether receiving aperture in the airbag during deployment, but prior to the airbag being in fully deployed in the deployed orientation in accordance with the second embodiment.
Figure 16:
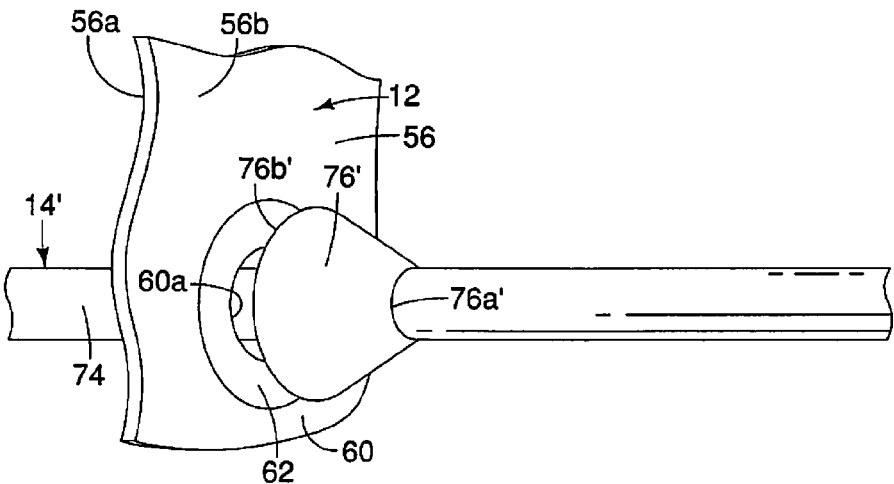
FIG. 16 is yet another perspective view of the distal end of the airbag similar to FIGS. 14 and 15, showing the one-way movement restricting member of the tether in an extended state after passing through the tether receiving aperture in the airbag with the airbag in the deployed orientation, and the one-way movement restricting member on a second side of the airbag preventing movement of the airbag away from the deployed orientation in accordance with the second embodiment.

Referring now to FIGS. 14, 15 and 16, a tether 14' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the second embodiment all features of the airbag 12 are unchanged except that the tether 14 is replaced by a tether 14'. The tether 14' is identical to the tether 14 except that the one-way movement member 76 of the first embodiment is replaced with a one-way movement member 76'.

The one-way movement member 76' is basically a conically shaped elastic member that is made of, for example, a flexible and resilient polymer, plastic or rubber material. The one-way movement member 76' has a conical shape with a fixed end 76a' and an open end 76b'. The fixed end 76a' is fixedly and non-movably attached to the tether section 74. The conical shape of the one-way movement member 76' provides the one-way movement member 76' with a tapered shape with the fixed end 76a' having a small diameter and the open end 76b' having a large diameter that is larger than the diameter of the tether receiving aperture 60a. The tapered shape of the one-way movement member 76' allows the one-way movement member 76' to enter and pass through the tether ring 62 and the tether receiving aperture 60a during deployment of the airbag 12. The one-way movement member 76' is initially in the extended orientation as depicted in FIG. 14. However, during deployment, the one-way movement member 76' moves to the compressed orientation as shown in FIG. 15. Once the one-way movement member 76' passes through the tether receiving aperture 60a, the resilient material of the one-way movement member 76' causes the one-way movement member 76' to return to the extended orientation (an uncompressed orientation).

The one-way movement member 76' is therefore dimensioned such that the one-way movement member 76' (at the open end 76b') contacts the second side 56a of the airbag 12 preventing the one-way movement member 76' from passing back through the tether receiving aperture 60a from the second side 56b to the first side 56a.

As shown in FIGS. 14 and 16, with the one-way movement member 76' in the extended orientation (uncompressed orientation) the open end 76b' of the one-way movement member 76' is wider than the tether receiving aperture 60a when the one-way movement member 76' is in the extended orientation, and the open end 76b' of the one-way movement member 76' is narrowed to a diameter approximately equal to the tether receiving aperture 60a when the one-way movement member 76' is in the compressed orientation (FIG. 15).

Third Embodiment

Figure 17:
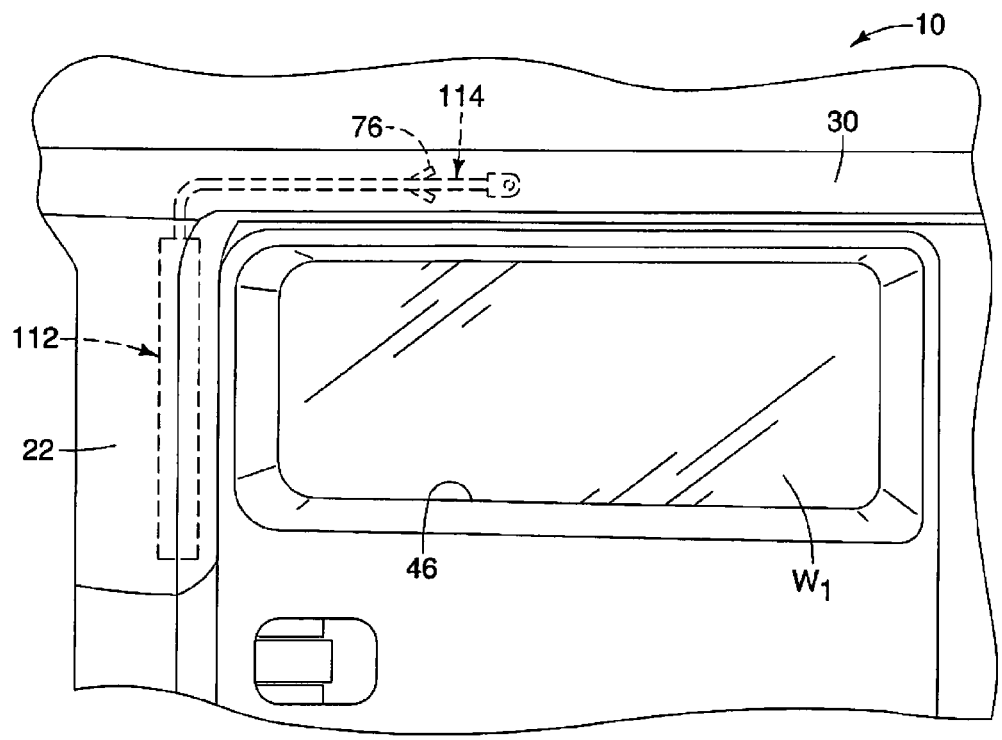
FIG. 17 is a side view of an interior surface of the passenger vehicle showing a first elongated vehicle structure (a pillar) and a second elongated vehicle structure (a roof rail) partially surrounding one of the windows of the passenger vehicle with an airbag and tether shown in a stowed orientation in accordance with a third embodiment.
Figure 18:
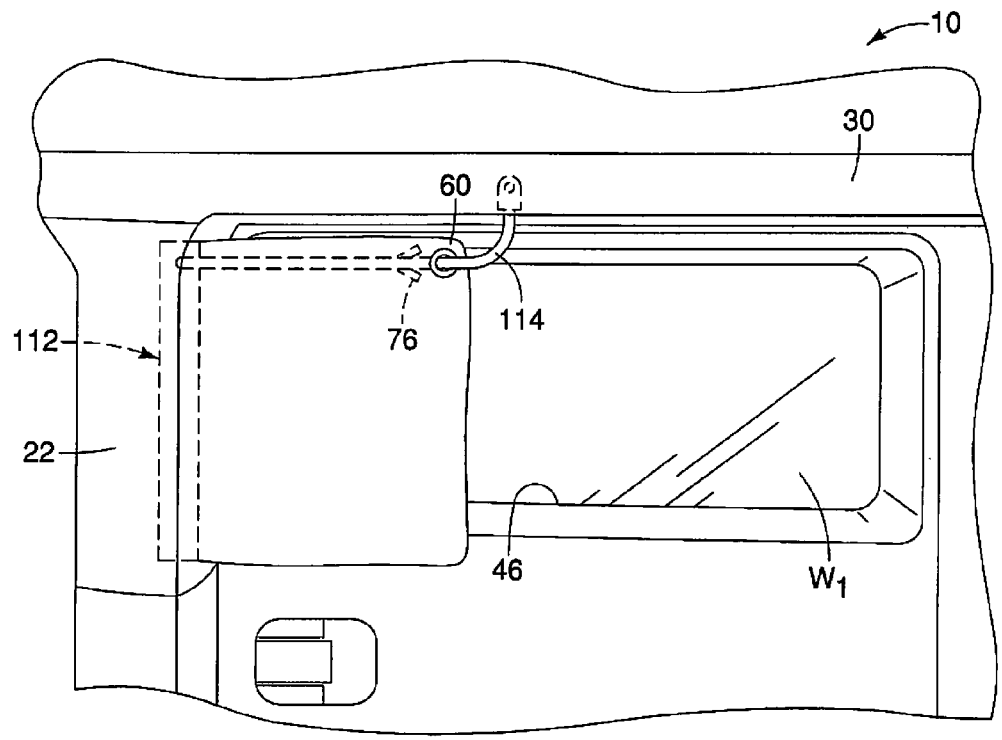
FIG. 18 is another side view of the interior surface the passenger vehicle similar to FIG. 17, showing the airbag and tether in a deployed orientation covering a portion of the window and being retained in the deployed orientation by a one-way movement restricting member of the tether in accordance with the third embodiment.

Referring now to FIGS. 17 and 18, an airbag 112 and a tether 114 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the airbag 112 identical components as compared to the airbag 12 of the first embodiment. However, in the third embodiment the airbag 112 is installed to the pillar structure 22 (first elongated body structure) instead of the roof rail structure 30. In other words, the airbag 112 is vertically oriented in the stowed orientation (FIG. 17) and moves in a horizontal direction during deployment, as indicated in FIG. 18. The tether 114 is identical to the tether 14 of the first embodiment, except that the tether 114 is installed to the roof rail structure 30 (second elongated body structure). The tether 114 includes the one-way movement member 76, as described with respect to the first embodiment.

In the third embodiment, the airbag 112 at least partially covers the window glass W₁ and the window opening 46 in the deployed orientation. However, it should be understood from the drawings and the description herein that the airbag 112 can be dimensioned such that it covers all of the window glass W₁ and the window opening 46 in the deployed orientation, instead of only partially covering the window glass W₁ and the window opening 46 in the deployed orientation as shown in FIG. 17.

Fourth Embodiment

Figure 19:
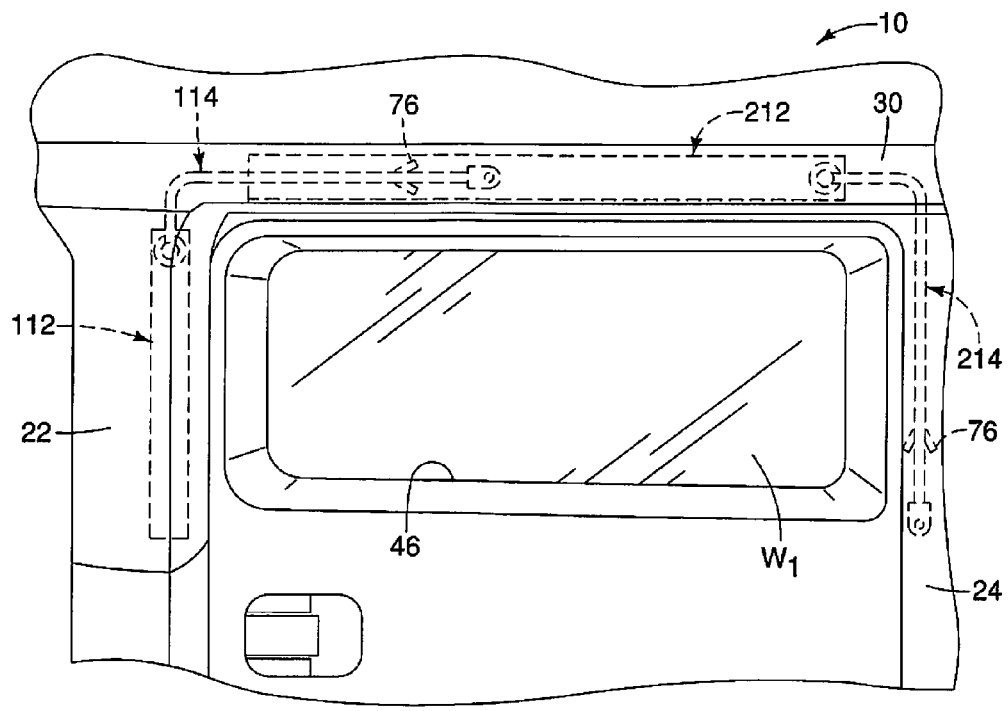
FIG. 19 is a side view of an interior surface of the passenger vehicle showing a first elongated vehicle structure (a pillar) and a second elongated vehicle structure (a roof rail) partially surrounding one of the windows of the passenger vehicle with a first airbag attached to the first elongated vehicle structure and a tether attached to the second elongated vehicle structure, with a second airbag attached to the second elongated vehicle structure and a second tether attached to a third elongated vehicle structure, both first and second airbags shown in a stowed orientation in accordance with a fourth embodiment.
Figure 20:
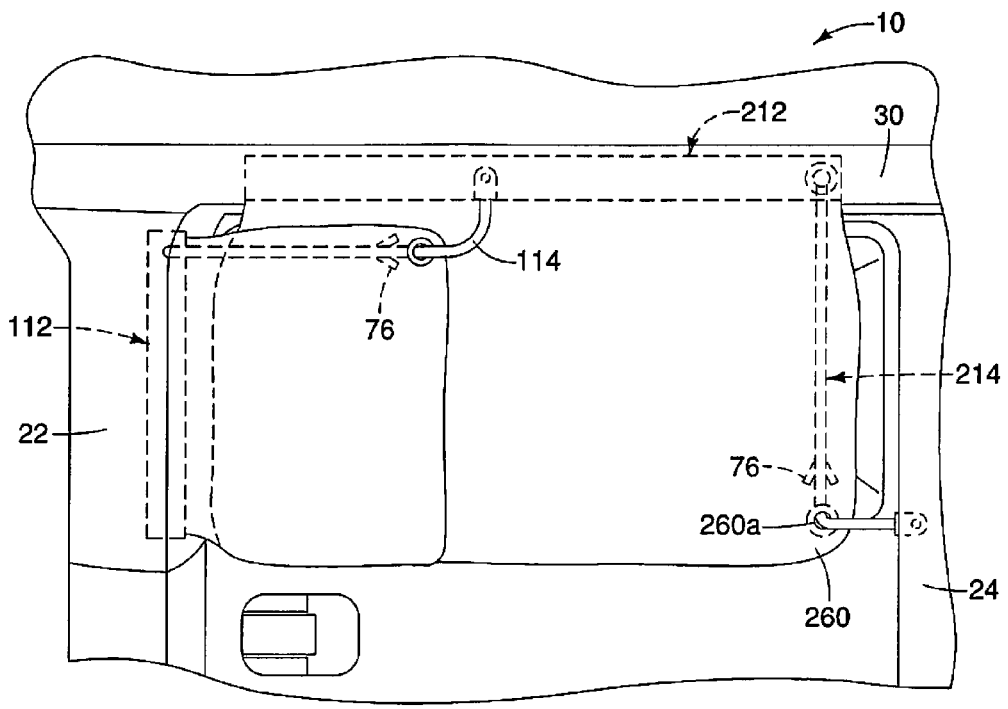
FIG. 20 is another side view of the interior surface the passenger vehicle similar to FIG. 19, showing the first airbag and the first tether in a deployed orientation covering a portion of the window, and with the second airbag and the second tether in a deployed orientation covering a remainder of the window, with the first airbag being retained in the deployed orientation by a one-way movement restricting member of the first tether and the second airbag being retained in the deployed orientation by a one-way movement restricting member of the second tether in accordance with the fourth embodiment.

Referring now to FIGS. 19 and 20, the airbag 112 and the tether 114 of the third embodiment and an airbag 212 and a tether 214 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, the airbag 112 and tether 114 are as described above with respect to the third embodiment. Specifically, the airbag 112 is vertically oriented in the stowed orientation (FIG. 19) and moves in a horizontal direction during deployment along the tether 114, as indicated in FIG. 20. The tether 114 includes the one-way movement member 76, as described with respect to the first embodiment.

In the fourth embodiment the airbag 212 is included along with the airbag 112. The airbag 212 is identical to the airbag 12 of the first embodiment except that a tether receiving aperture 260a is located at a distal end 260 proximate the pillar structure 24 in the deployed orientation, as shown in FIG. 20. Other than the location of the tether receiving aperture 260a and the distal end 260, the airbag 212 is identical to the airbag 12 of the first embodiment. Further, the tether 214 is located along the pillar structure 24 instead of the pillar structure 22. The tether 214 includes the one-way movement member 76, as described with respect to the first embodiment.

In the fourth embodiment, upon deployment, the airbag 212 moves downward to the deployed orientation and the airbag 112 moves rearward and horizontally upon deployment. The airbag 212 is guided downward by the tether 214 and prevented from moving upward by the one-way movement member 76, at least partially covering the window glass W₁ and the window opening 46 in the deployed orientation. The airbag 112 simultaneously deploys and moves horizontally and rearwardly to the deployed orientation guided by the tether 114 and prevented from moving back toward the pillar structure 22 by the one-way movement member 76. The airbag 112 can cover a first portion of the window opening 46, and the airbag 212 can cover a second portion of the window opening 46, such that together, the airbags 112 and 212 fully cover the window glass W₁ and the window opening 46 in the deployed orientation.

Fifth Embodiment

Figure 21:
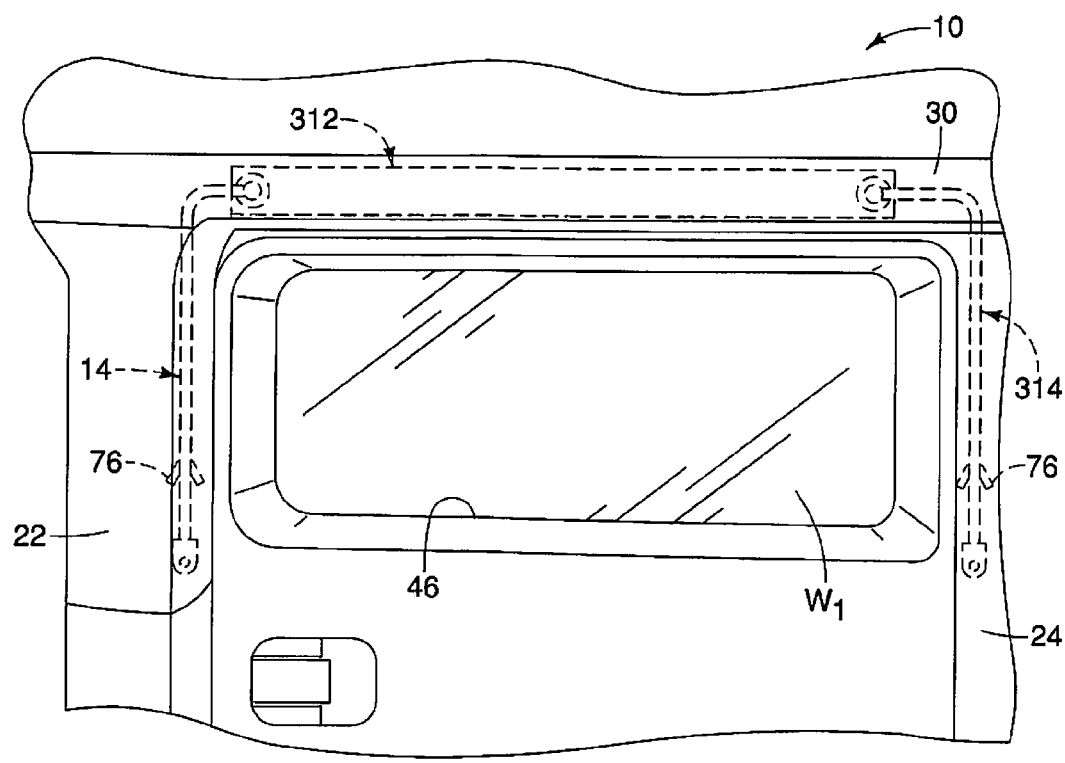
FIG. 21 is a side view of an interior surface of the passenger vehicle showing a first elongated vehicle structure (a roof rail) a second elongated vehicle structure (a B-pillar) and a third elongated vehicle structure (a C-pillar) partially surrounding one of the windows of the passenger vehicle with an airbag attached to the first elongated vehicle structure, a first tether attached to the second elongated vehicle structure and a second tether attached the third elongated vehicle structure all shown in a stowed orientation in accordance with a fifth embodiment.
Figure 22:
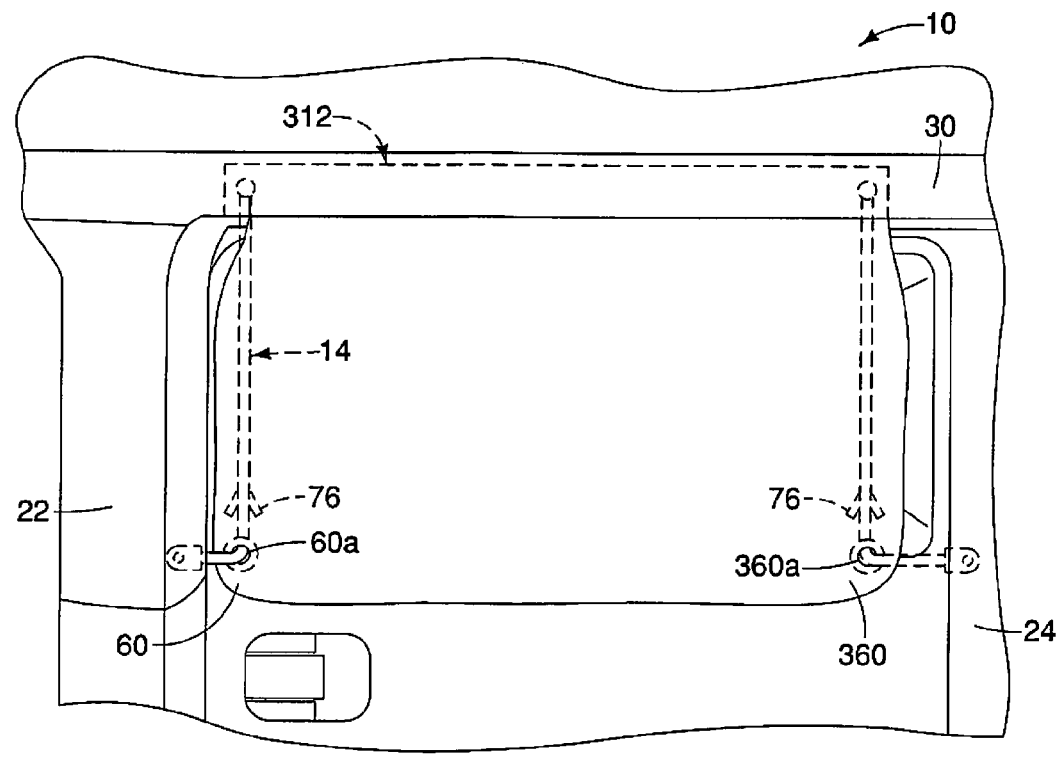
FIG. 22 is another side view of the interior surface the passenger vehicle similar to FIG. 21, showing the airbag, the first tether and the second tether in a deployed orientation covering the window with the airbag being retained in the deployed orientation by a one-way movement restricting member of the first tether and a one-way movement restricting member of the second tether in accordance with the fifth embodiment.

Referring now to FIGS. 21 and 22, an airbag 312 and tethers 14 and 314 in accordance with a fifth embodiment will now be explained. In view of the similarity between the first and fifth embodiments, the parts of the second embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the fifth embodiment, the airbag 312 is identical to the airbag 12 and includes all of the features of the airbag 12 of the first embodiment. However, in the fifth embodiment, the airbag 312 receives both the tether 14 of the first embodiment and a second tether 314. Further, the airbag 312 includes a second tether receiving aperture 360a located at a second distal end 360.

The tether 314 is identical to the tether 14 except that the tether 314 is installed to the pillar structure 24 and extends through the second tether receiving aperture 360a of the airbag 312. Hence, the airbag 312 includes the tether 14 along the pillar structure 22 and the tether 314 along the pillar structure 24. Both the tether 14 and the tether 314 include one-way movement members 76. Thus, when the airbag 312 moves from the stowed orientation (FIG. 21) to the deployed orientation (FIG. 22) both sides of the airbag 312 are guided to the deployed orientation by the tethers 14 and 314. Further, both distal ends 60 and 360 are prevented from moving upward and are retained in the deployed orientation by the two one-way movement members 76.

In each of the above embodiments, the depicted airbags each include at least one tether with a one-way movement member that allows the airbag to fully inflate and move to the deployed orientation, and also prevents the airbag from moving away from the deployed orientation after deployment back towards the stowed orientation. Hence, the one-way movement members described above ensure that the airbags continue to cover the adjacent window opening after deployment and after completion of the impact event. Further, by including the one-way movement members with the tethers, the airbags do not move away from the window opening but continue to cover the window opening and remain inboard of the window opening long after deployment. Thus after an impact event has occurred, the window opening within the vehicle 10 remains covered with the airbags being maintained in the deployed orientation for an extended period of time after deployment.

The various features and elements of the vehicle 10, such as body structures, suspension and drive train elements are conventional components that are well known in the art. Since these components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the title. Accordingly, these terms, as utilized to describe the present invention should be interpreted relative to a vehicle equipped with the title.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure comprising
a first elongated body structure extending in a first direction;
a second elongated body structure extending in a second direction transverse to the first direction, the first and second elongated body structures at least partially surrounding a window opening;
an airbag having a mounting structure mounted to and extending along the first elongated body structure, the airbag having a distal end positioned adjacent to the mounting structure in a stowed orientation and arranged to move in the second direction along the second elongated structure to a deployed orientation such that the distal end is spaced apart from the mounting structure and the airbag at least partially covers the window opening in the deployed orientation, the distal end of the airbag having a tether receiving aperture;
a tether having an airbag end and an anchor end, the airbag end being fixed to a first location proximate a first end of the mounting structure of the airbag adjacent to the second elongated body structure, the anchor end being fixedly attached to the second elongated body structure at a second location proximate a distal end of the airbag with the airbag in the deployed orientation, the tether extending through the tether receiving aperture such that during movement of the airbag from the stowed orientation to the deployed orientation the distal end moves along the tether; and
a one-way movement member fixed to the tether proximate the anchor end but spaced apart from the anchor end, the one-way movement member passing through the tether receiving aperture from a first side of the airbag to a second side of the airbag in response to the airbag moving from the stowed orientation to the deployed orientation, and with the airbag in the deployed orientation the one-way movement member retains the airbag in the deployed orientation and limits movement of the distal end of the airbag with respect to the second location, the one-way movement member having an extended orientation and a compressed orientation, the one-way movement member moving from the extended orientation to the compressed orientation as the one-way movement member extends into the tether receiving aperture, and the one-way movement member including at least a pair of coaxially pivoted wings, and a biasing member positioned between the wings and biasing the wings toward the extended orientation.

2. The vehicle body structure according to claim 1, wherein the tether receiving aperture is reinforced with a rigid grommet.

3. The vehicle body structure according to claim 1, wherein the one-way movement member has a fixed end fixed to the tether, and an open end that is wider than the fixed end when the one-way movement member is in the extended orientation.

4. The vehicle body structure according to claim 3, wherein the open end of the one-way movement member is positioned closer to the anchor end of the tether than the fixed end of the one-way movement member.

5. The vehicle body structure according to claim 3, wherein the open end of the one-way movement member contacts the second side of the airbag to prevent the one-way movement member from passing through the tether receiving aperture from the second side to the first side.

6. The vehicle body structure according to claim 3, wherein the open end of the one-way movement member is wider than the tether receiving aperture when the one-way movement member is in the extended orientation, and the open end of the one-way movement member is narrower than the tether receiving aperture when the one-way movement member is in the compressed orientation.

7. The vehicle body structure according to claim 1, wherein the one-way movement member has a tapered shape when in the extended orientation to facilitate movement to the compressed orientation as the one-way movement member passes through the tether receiving aperture.

8. The vehicle body structure according to claim 1, wherein the first elongated body structure is a roof rail extending in a vehicle longitudinal direction, and the second elongated body structure is a pillar extending in an upright direction.

9. The vehicle body structure according to claim 8, further comprising
a trim panel attached to the pillar covering the tether with the airbag in the stowed orientation, and
a headliner that covers the roof rail, the airbag and the mounting structure of the airbag with the airbag in the stowed orientation.

10. The vehicle body structure according to claim 1, wherein
the first elongated body structure is a pillar extending in an upright direction, and the second elongated body structure is a roof rail extending in a vehicle longitudinal direction.

11. The vehicle body structure according to claim 10, further comprising
a headliner that covers the roof rail and the tether with the airbag in the stowed orientation, and
a trim panel attached to the pillar covering the airbag and the mounting structure of the airbag with the airbag in the stowed orientation.

12. A vehicle body structure comprising
a first elongated body structure extending in a first direction;
a second elongated body structure extending in a second direction transverse to the first direction, the first and second elongated body structures at least partially surrounding a window opening;
an airbag having a mounting structure mounted to and extending along the first elongated body structure, the airbag having a distal end positioned adjacent to the mounting structure in a stowed orientation and arranged to move in the second direction along the second elongated structure to a deployed orientation such that the distal end is spaced from the mounting structure and the airbag at least partially covers the window opening in the deployed orientation, the distal end of the airbag having a tether receiving aperture;
a tether having an airbag end and an anchor end, the airbag end being fixed to a first location proximate a first end of the mounting structure of the airbag adjacent to the second elongated body structure, the anchor end being fixedly attached to the second elongated body structure at a second location proximate a distal end of the airbag with the airbag in the deployed orientation, the tether extending through the tether receiving aperture such that during movement of the airbag from the stowed orientation to the deployed orientation the distal end moves along the tether; and
a one-way movement member having a fixed end fixed to the tether proximate the anchor end but spaced apart from the anchor end, and an open end that is wider than the fixed end, the one-way movement member having an extended orientation in which the open end is wider than the fixed end, and a compressed orientation such that the one-way movement member is compressed to the compressed orientation as the one-way movement member passes through the tether receiving aperture from a first side of the airbag to a second side of the airbag in response to the airbag moving from the stowed orientation to the deployed orientation, and with the airbag in the deployed orientation and the one-way movement member positioned on the second side of the airbag and in the extended orientation, the open end of the one-way movement member is wider than the tether receiving aperture and contacts the second side of the airbag to retain the airbag in the deployed orientation and limit movement of the distal end of the airbag with respect to the second location, the one-way movement member further including at least a pair of coaxially pivoted wings, and a biasing member positioned between the wings and biasing the wings toward the extended orientation.

13. The vehicle body structure according to claim 12, wherein
the first elongated body structure is a roof rail extending in a vehicle longitudinal direction, and the second elongated body structure is a pillar extending in an upright direction.

14. The vehicle body structure according to claim 12, wherein the first elongated body structure is a pillar extending in an upright direction, and the second elongated body structure is roof rail extending in a vehicle longitudinal direction.

* * * * *